United States Patent [19]

Foss et al.

[11] Patent Number: 4,730,799

[45] Date of Patent: Mar. 15, 1988

[54] GLUE GUN ORGANIZER

[75] Inventors: Gerald E. Foss; William C. Magnuson, both of Minnetonka, Minn.

[73] Assignee: Best Tool, Inc., Plymouth, Minn.

[21] Appl. No.: 43,428

[22] Filed: Apr. 28, 1987

[51] Int. Cl.[4] .................................................. F16L 3/00

[52] U.S. Cl. ..................................... 248/51; 211/60.1; 211/70.6; 211/106; 211/181; 248/117.2; 248/153; 248/175; 248/315

[58] Field of Search ...................... 248/175, 176, 309.1, 248/314, 315, 316.8, 117.1, 117.2, 302, 339, 51, 153; 211/13, 181, 70.6, 60.1, 64, 106; 126/284

[56] References Cited

U.S. PATENT DOCUMENTS

| | | | |
|---|---|---|---|
| 3,294,348 | 12/1966 | Cerisano | 248/176 |
| 3,367,611 | 2/1968 | Munson | 248/117.1 |
| 3,385,451 | 5/1968 | Anderson | 211/60.1 |
| 3,487,951 | 1/1970 | Beltzung | 211/133 |
| 3,759,538 | 9/1973 | Fabiano | 211/70.6 X |
| 3,912,211 | 10/1975 | Topf | 248/497 X |
| 4,333,623 | 6/1982 | May | 248/176 |
| 4,446,972 | 5/1984 | Sussman | 211/60.1 X |
| 4,673,148 | 6/1987 | Oliver | 248/315 X |

OTHER PUBLICATIONS

"Solid State Electronic Heating Control Hot Melt Glue Gun", advertising brochure of Best Tool, Inc., Plymouth, MN.

*Primary Examiner*—J. Franklin Foss
*Assistant Examiner*—David L. Talbott
*Attorney, Agent, or Firm*—Kinney & Lange

[57] ABSTRACT

A glue gun organizer including a metal base for glue to drip on, a U-shaped member for holding the glue gun, a specific area for the storage of extra glue sticks, a tray for the presentation of parts, a pair of members for storage of an electric cord and a wall mounting bracket for hanging the equipment out of the way.

8 Claims, 3 Drawing Figures

GLUE GUN ORGANIZER

BACKGROUND OF THE INVENTION

1. Field of the Invention

The present invention relates to a glue gun holder and organizer arrangement for use in the process of using glue guns.

2. Description of the Prior Art

In the past, glue guns have been provided with small plastic or metal attachments usually in the form of a upright member extending from a tripod arrangement or flat based arrangement against which the tip of a hot glue gun can be rested to prevent it from falling onto the table or surrounding equipment. Difficulties have been encountered with the prior art devices due to constant picking up and laying down of the glue gun or the force that may be exerted on the gun due to a trailing electric cord or a little carelessness, on the part of the operator with the result that the glue gun may not always be rested accurately and the tripod or other holder arrangement falls over allowing the hot glue gun to come in contact with other surfaces and possibly burn or otherwise mar them. Furthermore, the prior art holders have not provided any particular protection to keep hot dripping glue that may come from the end of the glue gun from falling onto the table or equipment. The prior art also provided no convenient place where extra glue sticks and piece parts could be stored and these items have heretofore been kept in separate units and thus were not convenient and tended to get displaced from the glue gun. Finally, the prior art provided no convenient way to store the glue gun and its peripheral equipment out of the way and off the work surface so that other work may be performed.

SUMMARY OF THE INVENTION

The present invention provides a metal based and wire structure solidly formed into a shape that permits holding of a glue gun in a stable position so that any glue that may drip from the end thereof will fall onto the metal base where it will harden and then be easily removed. The wire structure, which acts as a heat sink, also provides one or more areas for the storage of extra glue sticks and a parts tray that can fit into the structure and thus hold peripheral equipment such as piece parts or a damp sponge. A J-shaped wall mounting member is also provided for holding the wire structure and glue gun away from the work surface when desired. A pair of L-shaped members on the wire frame permit the electric cord to be wound therearound thus preventing unwanted force on the glue gun and providing a tidy method for storage after use.

A more complete understanding of the present invention will be obtained upon examination of the following specification and drawings.

DETAILED DESCRIPTION OF THE PREFERRED EMBODIMENTS

Figure 1:
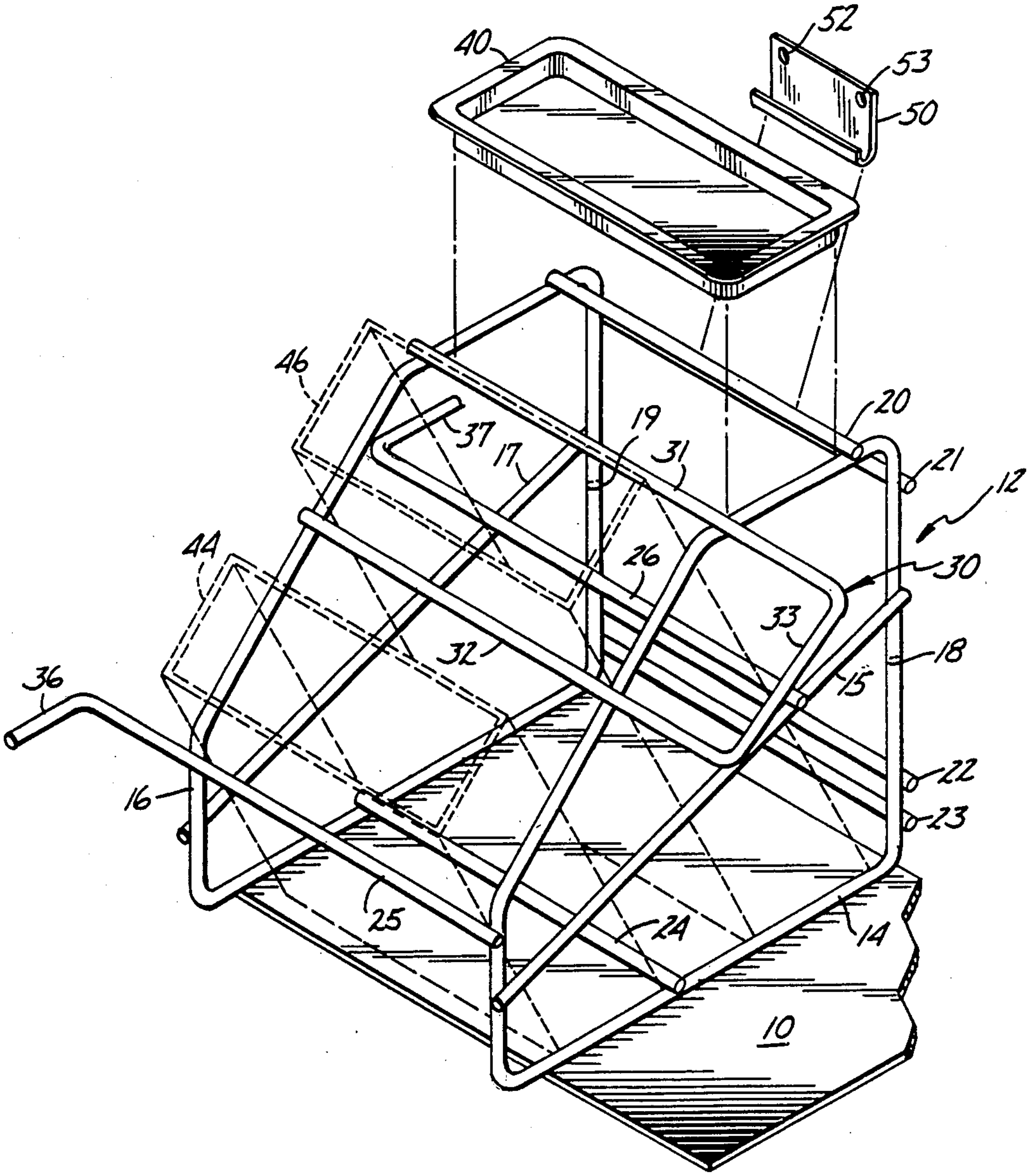
FIG. 1 is a perspective view of the present invention showing, in phantom, the storage arrangement for extra glue sticks.
Figure 2:
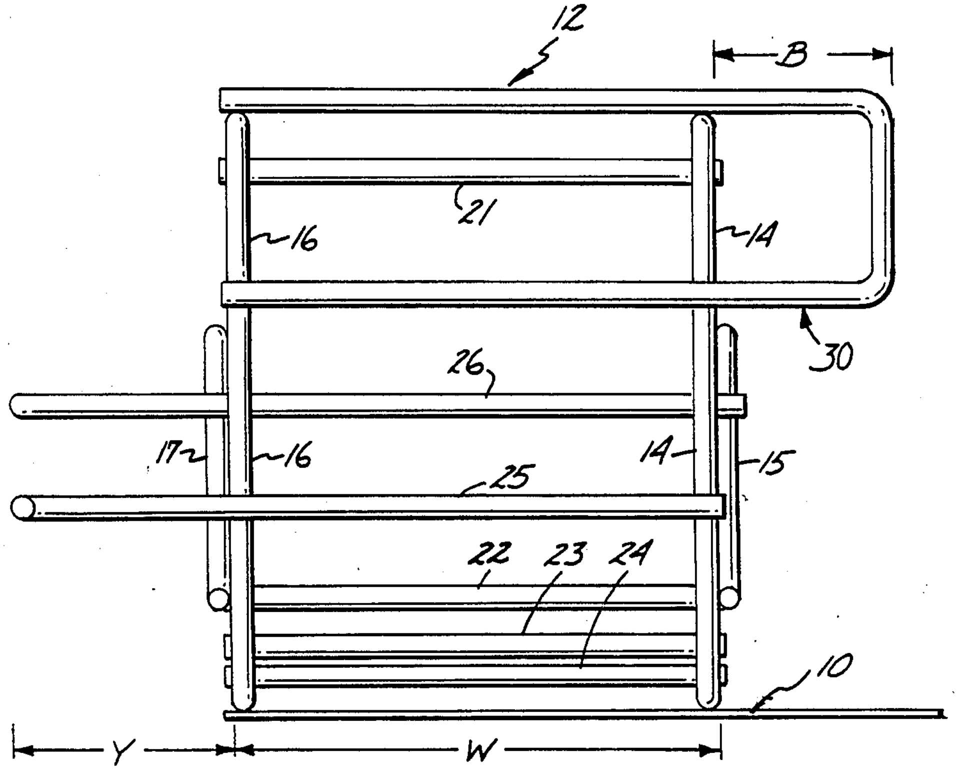
FIG. 2 is a front view of the present invention.
Figure 3:
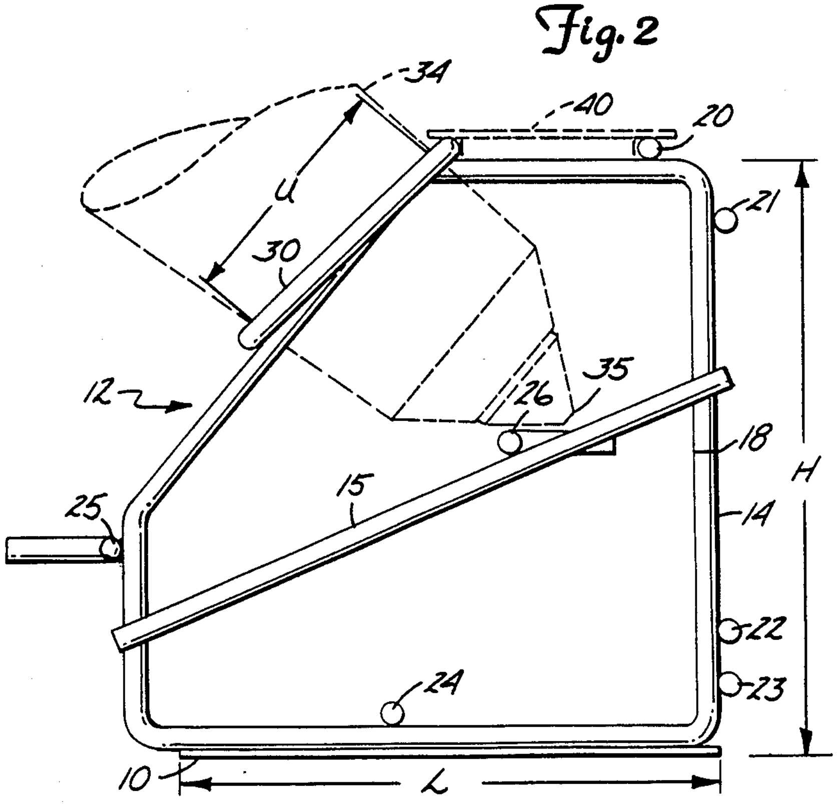
FIG. 3 is a side view of FIG. 2 which shows, in phantom, the glue gun and parts tray mounted thereon.

Reference should be had to FIGS. 1–3 in which elements which are the same in all drawings have the same reference numeral.

The figures show a metal base 10 to which a wire structure generally shown by reference numeral 12 is attached by conventional techniques such as spot welding. The wire structure 12 comprises a pair of somewhat trapezoidal shaped members 14 and 16 which have a length "L" and height "H". Members 14 and 16 are mounted on base 10 a distance "W" apart and rise vertically therefrom as best seen in FIGS. 2 and 3. Members 14 and 16 may be made of wire, which is bent into the shape shown, with the ends thereof connected together such as shown at areas 18 and 19 in FIGS. 1 and 3. A plurality of cross brace members identified by reference numerals 20, 21, 22, 23, 24, 25, and 26 are fastened to members 14 and 16 at various positions around the periphery thereof and serve to hold the members 14 and 16 in a rigid solid position and also to provide places for containers to rest as will be described hereinafter. A U-shaped member 30 with arms 31 and 32 having a length "W" plus "B" and a shoulder 33 of width "E" is shown fastened to the upright members 14 and 16 in an area near the top thereof so as to be at an angle of approximately 40° with respect to base 10. The U-shaped end of member 30 extends beyond member 14 by the distance "B" so chosen as to enable a glue gun, such as is shown in phantom by dashed line 34 having a gluing tip 35 to lodge between the U-shaped portion 30 and member 14 in a firm fashion. The wire also acts as a heat sink to cool the glue gun 34 for the operator to grasp. Smaller glue guns may be easily accomodated by use of an insert filled into the U-shaped member 30. It should be noted that the base 10 extends beyond member 14 by an amount sufficient to cause any glue which may tend to drip off the tip 35 to fall onto the metal base 10 where it will dry and then be easily cleaned.

It should also be noted that cross members 25 and 26 extend beyond the vertical member 16 by a distance "Y" and that they are bent at ends 36 and 37, respectively, which extend in opposite directions. This provides a means for wrapping the electric cord of the glue gun therearound so that it does not unnecessarily pull on the glue gun and for neatness in storage.

As best seen in FIG. 1, a tray 40 is shown in exploded form above the frame member 12 but is sized so that it will fit between the cross brace 20 and the upper arm 31 of the U-shaped member 30 and also between the upper parts of members 14 and 16 where it may then be used to hold extra parts or equipment used in connection with gluing.

FIG. 1 also shows in phantom a pair of boxes 44 and 46 which may be the original containers in which glue sticks are sold, extending down in slantwise fashion to the base 10. More particularly, box 44 extends between cross braces 25 and the lower arm 32 of the U-shaped member 30 while box 46 extends from the lower arm 32 to the upper arm 31 of U-shaped member 30. A plurality of glue sticks may then be placed in the boxes 44 and 46 for convenience in gluing. It is seen that box 46 is longer than box 44 so that different lengths of glue sticks may be accomodated.

Finally, FIG. 1 shows a J-shaped member 50 adapted for mounting the wire structure 12 and base 10 on a vertical surface such as a nearby wall with fastening means such as screws 52 and 53. A lower part of the "J" is made to fit around one of the cross braces such as 21, 22 or 23 and thus hold the structure elevated from the work surface for use in storage or, if convenient, while the glue gun work is being performed.

It is thus seen that I have provided a easily constructed, inexpensive, simple and convenient glue gun organizer which will not tip over when in use and which protects the work surface from dripping glue while providing a place for spare parts and extra glue sticks and a place for the electric cord to wind around. Many changes will occur to those skilled in the art, and I do not wish to be limited to the specific disclosures used in connection with the preferred embodiments. I wish only to be limited by the following claims.

What is claimed is:

1. Apparatus for use with a heat glue gun comprising:
   - a generally flat metal base member;
   - a wire structure fastened to and extending away from said base member, said wire structure including first and second main members each having a substantially horizontal portion a distance "H" from the base member and a slat portion angled from the horizontal portion towards the base member, the main members being fastened to the base member a distance "W" apart; said wire structure further including a plurality of cross braces each having a first portion fastened to said first main member and a second portion fastened to said second main member, a first pair of cross braces and the horizontal portions of the main members forming a first outline of predetermined configuration; a second pair of cross braces and the slant portions of the main members forming a second outline of predetermined configuration; a tray member sized to fit within the first configuration and the second configuration operating to permit the stacking of first extra glue sticks; and
   - U-shaped means on said wire structure, lying at an acute angle to the base member and extending beyond the distance "W" by an amount "B" so as to hold a glue gun in a position which allows any excess glue therefrom to drip onto said base.

2. Apparatus according to claim 1 further including first and second "L" shaped members fastened at spaced apart positions on the wire structure with bent portions extending in opposite directions so as to hold an electric cord of the glue gun.

3. Apparatus according to claim 1 further including a "J" shaped member adapted for wall mounting and operable to hold the wire structure in a hanging position.

4. Apparatus according to claim 2 further including a "J" shaped member adapted for wall mounting and operable to hold the wire structure in a hanging position.

5. Apparatus according to claim 1 further including a third pair of cross members extending between the slant portions of the main members to form a third outline of predetermined configuration, the third configuration operating to permit the stacking of second extra glue sticks.

6. Apparatus according to claim 5 further including first and second "L" shaped members fastened at spaced apart positions on the wire structure with bent portions extending in opposite directions so as to hold an electric cord of the glue gun.

7. Apparatus according to claim 5 further including a "J" shaped member adapted for wall mounting and operable to hold the wire structure in a hanging position.

8. Apparatus according to claim 6 further including a "J" shaped member adapted for wall mounting and operable to hold the wire structure in a hanging position.

* * * * *